US008895123B2

(12) United States Patent
Ek et al.

(10) Patent No.: US 8,895,123 B2
(45) Date of Patent: *Nov. 25, 2014

(54) POLYOLEFIN MULTILAYER PIPE

(75) Inventors: Carl-Gustaf Ek, Vaestra Froelunda (SE); Hans Sandberg, Roennaeng (SE); Siegfried Liedauer, Wilhering (AT); James McGoldrick, Marchtrenk (AT)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/592,323

(22) Filed: Nov. 23, 2009

(65) Prior Publication Data

US 2010/0071796 A1 Mar. 25, 2010

Related U.S. Application Data

(63) Continuation of application No. 10/478,402, filed as application No. PCT/EP02/05551 on May 21, 2002, now abandoned.

(30) Foreign Application Priority Data

May 21, 2001 (EP) .................................... 01112368

(51) Int. Cl.
| | |
|---|---|
| *C08F 210/06* | (2006.01) |
| *F16L 9/133* | (2006.01) |
| *F16L 9/12* | (2006.01) |
| *F16L 9/127* | (2006.01) |
| *B32B 1/08* | (2006.01) |
| *C08K 5/00* | (2006.01) |
| *B32B 27/32* | (2006.01) |
| *C08L 23/10* | (2006.01) |
| *C08F 110/06* | (2006.01) |

(52) U.S. Cl.
CPC ............... *F16L 9/133* (2013.01); *C08L 23/10* (2013.01); *C08F 110/06* (2013.01); *C08F 210/06* (2013.01); *B32B 1/08* (2013.01); *C08K 5/0083* (2013.01); *B32B 27/32* (2013.01); *F16L 9/12* (2013.01); *F16L 9/127* (2013.01); *Y10S 138/07* (2013.01)
USPC ... 428/36.91; 428/35.7; 138/140; 138/DIG. 7

(58) Field of Classification Search
CPC ............. F16L 9/127; F16L 9/133; F16L 9/12; C08K 5/0083; C08L 23/10; C08F 110/06; C08F 210/06
USPC .............................................. 428/35.7, 36.91
See application file for complete search history.

(56) References Cited

U.S. PATENT DOCUMENTS

| | | | |
|---|---|---|---|
| 4,386,129 A | 5/1983 | Jacoby et al. | |
| 4,975,469 A | 12/1990 | Jacoby et al. | |
| 4,981,938 A * | 1/1991 | Hanari et al. | .................. 526/351 |
| 5,231,126 A | 7/1993 | Shi et al. | |
| 5,310,584 A * | 5/1994 | Jacoby et al. | ..................... 428/2 |
| 5,387,386 A * | 2/1995 | Kirjavainen | ............. 264/171.29 |
| 5,681,922 A | 10/1997 | Wolfschwenger et al. | |
| 5,716,998 A | 2/1998 | Munakata et al. | |
| 6,169,144 B1 | 1/2001 | Higashi et al. | |
| 6,187,402 B1 * | 2/2001 | Ek et al. | .................... 428/36.91 |
| 6,235,823 B1 | 5/2001 | Ikeda et al. | |
| 6,251,995 B1 * | 6/2001 | Hesse et al. | .................... 525/191 |
| 6,279,614 B1 * | 8/2001 | Riesselmann et al. | ........ 138/137 |
| 6,433,087 B1 * | 8/2002 | Ebner et al. | .................... 525/191 |
| 6,444,301 B1 | 9/2002 | Davidson et al. | |
| 6,503,993 B1 * | 1/2003 | Huovinen et al. | .......... 526/348.1 |
| 6,632,850 B2 | 10/2003 | Hughes et al. | |
| 6,747,103 B1 * | 6/2004 | Vestberg et al. | .............. 526/128 |
| 7,235,203 B2 | 6/2007 | Sadamitsu et al. | |
| 2003/0008091 A1 * | 1/2003 | Konrad et al. | ............... 428/36.9 |
| 2003/0157286 A1 * | 8/2003 | Hesse et al. | ................... 428/36.5 |
| 2004/0157019 A1 | 8/2004 | McGoldrick et al. | |
| 2004/0157969 A1 * | 8/2004 | McGoldrick et al. | .......... 524/210 |
| 2004/0170790 A1 | 9/2004 | Ek et al. | |
| 2005/0025922 A1 | 2/2005 | Rydin et al. | |
| 2005/0165156 A1 * | 7/2005 | Rydin et al. | ................... 524/543 |
| 2005/0277720 A1 * | 12/2005 | Ek et al. | ......................... 524/425 |

FOREIGN PATENT DOCUMENTS

| | | |
|---|---|---|
| DE | 36 10 644 | 10/1986 |
| DE | 199 27 477 | 12/1999 |
| EP | 0 790 262 | 8/1997 |
| EP | 0 972 801 | 1/2000 |
| JP | 09227707 | 9/1997 |
| WO | WO-96/23239 | 8/1996 |
| WO | WO-97/13790 | 4/1997 |
| WO | WO 9924479 A1 * | 5/1999 |
| WO | WO-99 40151 | 8/1999 |
| WO | WO 9940151 A1 * | 8/1999 |
| WO | WO-01 40327 | 6/2001 |
| WO | WO-02/38670 | 5/2002 |

OTHER PUBLICATIONS

"Polypropylene: An A-Z reference", ed. Karger-Kocsis, J., Kluwer Academic Publishers, Dordrecht, The Netherlands, 1999.*

(Continued)

*Primary Examiner* — Michele L Jacobson
(74) *Attorney, Agent, or Firm* — Jordan and Hamburg LLP

(57) ABSTRACT

Polyolefin multilayer pipes consisting at least one of the layers of a β-nucleated propylene homopolymer and/or β-nucleated copolymers from 90.0 to 99.9% by weight of propylene and 0.1 to 10.0% by weight of α-olefins. The pipes are to be classified in ring stiffness class ≥4. The pipes are suitable for non pressure pipe applications, preferably for outdoor use, for above as well as underground drainage and sewerage pipe systems, surface water pipes, pipes for cable protection, pipes for cold climate conditions and for indoor use, soil and waste water pipes.

21 Claims, No Drawings

(56) References Cited

OTHER PUBLICATIONS

1996, Polypropylene Handbook, Polymerization, Characterization, Properties, Processing, Applications, Edward P. Moore, Jr., pp. 303-348.

Results and Experiences From Tests on PEX, PEM, PP and PVC Pipes Exposed to Different Chemicals, U. Anderson, et al, Studsvik Polymer AB, Sweden, (1998 Conference Papers, "Plastic Pipeline Systems for the Millenium", Goeteborg, pp. 611-620).

Process/property interactions in PE pipelines, P. Davis, et al., Department of Mechanical Engineering, Imperial College, London (1998 Conference Papers, "Plastic Pipeline Systems for the Millenium", Goeteborg, pp. 841-842).

Thermal behaviour of polypropylene fractions: 1. Influence of tacticity and molecular weight on crystallization and melting behaviour, Ritva Paukkeri, et al.,; Polymer, 993, vol. 34, No. 19, pp. 4075-7082.

* cited by examiner

POLYOLEFIN MULTILAYER PIPE

FIELD OF THE INVENTION

The invention relates to polyolefin multilayer pipes, fittings, chambers and the like wherein at least one of the layers comprises a β-nucleated propylene polymer, as well as a process for producing them.

BACKGROUND OF THE INVENTION

Polyolefin multilayer pipes wherein at least one of the layers of the multilayer pipe comprises a propylene polymer are known.

WO 98/43806 discloses a multilayer plastic tube, comprising a base tube consisting of a propylene polymer, a barrier layer coating the base tube, and a protective layer, containing a lubricant, applied on top of the barrier layer.

WO 97/33117 discloses a multilayer pipe with at least two layers of different plastic materials, in which one layer consists of a Ziegler-Natta propylene copolymer, optionally with 1-30% by weight elastomer content.

The disadvantage of these multilayer pipes is the insufficient balance of high stiffness and good impact properties, especially at low temperatures.

OBJECT OF THE INVENTION

It is the object of the present invention to provide polyolefin multilayer pipes, where at least one of the layers of the multilayer pipe comprises a β-nucleated propylene polymer, with a superior combination of high stiffness and good impact properties, especially at low temperatures.

BRIEF DESCRIPTION OF THE INVENTION

According to the present invention, this object is achieved by polyolefin multilayer pipes where at least one of the layers of the multilayer pipe comprises a propylene homopolymer with melt indices of 0.05 to 10 g/10 min at 230° C./2.16 kg or propylene copolymers from 90.0 to 99.9% by weight of propylene and 0.1 to 10.0% by weight of α-olefins with 2 or 4 to 18 carbon atoms with melt indices of 0.05 to 15 g/10 min at 230° C./2.16 kg, or mixtures thereof, wherein the propylene homopolymers and/or propylene copolymers are β-nucleated propylene polymers and the multilayer pipe with a pipe diameter of less than 0.25 m has an impact energy $E_D$ (normalised) of at least 400 Nm/m and a ring stiffness S determined according to ISO 9969 ≥4 kN/m² and a multilayer pipe with a pipe diameter of ≥0.25 m has an impact energy E of at least 120 Nm and a ring stiffness S determined according to ISO 9969 ≥4 kN/m².

β-nucleated propylene polymers are isotactic propylene polymers composed of chains in a $3_1$ helical conformation having an internal microstructure of β-form spherulites being composed of radial arrays of parallel stacked lamellae. This microstructure can be realized by the addition of β-nucleating agents to the melt and crystallization. The presence of the β-form can be detected through the use of wide angle X-ray diffraction (Moore, J., Polypropylene Hand-book, p. 134-135, Hanser Publishers Munich 1996).

According to an advantageous feature of the present invention the β-nucleated propylene polymers in at least one of the layers of the multilayer pipe are β-nucleated propylene homopolymers having an IRτ ≥0.98, a tensile modulus of ≥1500 MPa at +23° C. and a Charpy impact strength, using notched test specimens, at −20° C. ≥3 kJ/m² and/or β-nucleated propylene block copolymers having an IRτ of the propylene homopolymer block of ≥0.98, a tensile modulus of ≥1100 MPa at +23° C. and a Charpy impact strength ≥6 kJ/m² at −20° C. using notched test specimens.

The IRτ of the propylene polymers is measured and calculated as described in EP 0 277 514 A2 on page 5 (column 7, line 53 to column 8, line 11).

According to a preferred embodiment the β-nucleated propylene homopolymers or the propylene homopolymer block of the β-nucleated propylene block copolymers have an IRτ of ≥0.985. The difference of 0.005 in IRτ, IRτ being a measure for isotacticity, encompasses a significant increase in mechanical polymer properties, especially in stiffness.

The propylene homopolymers used in at least one layer of the multilayer pipe according to the present invention have melt indices of 0.05 to 15 g/10 min at 230° C./2.16 kg, preferably 0.1 to 8 g/10 min at 230° C./2.16 kg, most preferably 0.2 to 5 g/10 min at 230° C./2.16 kg.

The propylene copolymers have melt indices of 0.05 to 20 g/10 min at 230° C./2.16 kg, preferably 0.1 to 8 g/10 min at 230° C./2.16 kg, most preferably 0.2 to 5 g/10 min at 230° C./2.16 kg.

According to the present invention the propylene homopolymers used for at least one layer of the multilayer pipe show a tensile modulus ≥1500 MPa, preferably ≥1600 MPa and the propylene copolymers show a tensile modulus ≥1100 MPa, preferably ≥1300 MPa and most preferably ≥1500 MPa.

The propylene homopolymers according to the present invention have a Charpy impact strength of ≥3 kJ/m² at −20° C., preferably 4 to 10 kJ/m² at −20° C., most preferably 5 to 10 kJ/m² at −20° C.

The propylene copolymers according to the present invention have a Charpy impact strength of ≥6 kJ/m² at −20° C., preferably ≥9 kJ/m² at −20° C., most preferably ≥10 kJ/m² at −20° C. Charpy impact strength of up to at least 60 kJ/m² is possible for copolymers used for the production of at least one layer of the multilayer pipe according to the invention.

According to a preferred embodiment of the present invention the β-nucleated propylene polymers with an IRτ ≥0.98 in at least one of the layers of the multilayer pipe being propylene polymers obtained by polymerization with a Ziegler-Natta catalyst system comprising titanium-containing solid components, an organoalumina, magnesium or titanium compound as cocatalyst and an external donor according to the formula

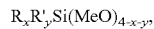

$R_xR'_ySi(MeO)_{4-x-y}$, wherein R and R' are identical or different and are branched or cyclic aliphatic or aromatic hydrocarbon residues, and y and x independently from each other are 0 or 1, provided that x+y are 1 or 2.

Example of propylene polymers with high stereospecifity obtained by polymerization with a Ziegler-Natta catalyst system, are propylene polymers as described in WO 99/24478 and WO 99/16797.

A preferred external donor in the Ziegler-Natta catalyst system for producing the propylene polymers with high stereospecifity comprised at least in one of the layers of the multilayer pipe is dicyclopentyldimethoxysilane.

According to an advantageous embodiment of the present invention the β-nucleated propylene polymer contains 0.0001 to 2.0 wt %, based on the polypropylenes used, dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, and/or diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, and/or amino acid derivative type diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, and/or quinacridone derivative compounds of the type quinacridone compounds, quinacridonequinone compounds, and/or dihydroquinacridone type compounds, and/or dicarboxylic acid salts of metals from group IIa of periodic system and/or mixtures of dicarboxylic acids and metals from group IIa of periodic system, and/or salts of metals from group IIa of periodic system and imido acids of the formula

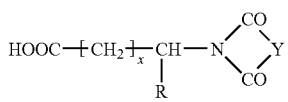

wherein x=1 to 4; R=H, —COON, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, as β-nucleating agent.

Example of the dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, optionally contained in the β-nucleated propylene polymers of at least one of the layers of the multilayer pipe, are N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide, N,N'-di-$C_5$-$C_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide, N,N'-di-$C_5$-$C_8$-cycloalkyl-terephthalamide compounds such as N,N'-dicyclohexylterephthalamide and N,N'-dicyclopentylterephthalamide, N,N'-di-$C_5$-$C_8$-cycloalkyl-1,4-cyclohexanedicarboxamide compounds such as N,N'-dicyclohexyl-1,4-cyclohexanedicarboxamide and N,N'-dicyclohexyl-1,4-cyclopentanedicarboxamide.

Example of the diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, optionally contained in the β-nucleated propylene polymers of at least one of the layers of the multilayer pipe, are N,N'—$C_6$-$C_{12}$-arylene-bis-benzamide compounds such as N,N'-p-phenylene-bis-benzamide and N,N'-1,5-naphthalene-bis-benzamide, N,N'—$C_5$-$C_8$-cycloalkyl-bis-benzamide compounds such as N,N'-1,4-cyclopentane-bis-benzamide and N,N'-1,4-cyclohexane-bis-benzamide.

N,N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide.

N,N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide.

Example of the amino acid derivative type diamide compounds, optionally contained in the β-nucleated propylene polymers of at least one of the layers of the multilayer pipe, are N-phenyl-5-(N-benzoylamino)pentaneamide and/or
N-cyclohexyl-4-(N-cyclohexylcarbonylamino)benzamide.

Example of the quinacridone type compounds, optionally contained in the O-nucleated propylene polymers of at least one of the layers of the multilayer pipe, are quinacridone, dimethylquinacridone and/or dimethoxyquinacridone.

Example of the quinacridonequinone type compounds, optionally contained in the β-nucleated propylene polymers of at least one of the layers of the multilayer pipe, are quinacridonequinone, a mixed crystal of 5,12-dihydro(2,3b)acridine-7,14-dione with quino(2,3b)acridine-6,7,13,14-(5H,12H)-tetrone as disclosed in EP-B 0 177 961 and/or dimethoxyquinacridonequinone.

Example of the dihydroquinacridone type compounds, optionally contained in the β-nucleated propylene polymers of at least one of the layers of the multilayer pipe, are dihydroquinacridone, dimethoxydihydroquinacridone and/or dibenzodihydroquinacridone.

Example of the dicarboxylic acid salts of metals of group IIa of periodic system, optionally contained in the β-nucleated propylene polymers of at least one of the layers of the multilayer pipe, are pimelic acid calcium salt and/or suberic acid calcium salt.

Example of salts of metals from group IIa of periodic system and imido acids of the formula

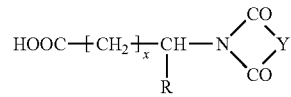

are the calcium salts of phthaloylglycine, hexahydrophthaloylglycine, N-phthaloylalanine and/or N-4-methylphthaloylglycine.

A still further embodiment of the present invention is a 3-layer pipe, wherein the outer and inner layer of the pipe comprises a β-nucleated propylene polymer and the mid layer comprises a recycled propylene polymer, a propylene polymer of higher stiffness than the β-nucleated propylene polymer, and/or a propylene polymer containing fillers.

A still further embodiment of the present invention is a 2-layer pipe, wherein the outer layer of the pipe comprises a β-nucleated propylene polymer and the inner layer comprises a recycled propylene polymer, a propylene polymer of higher stiffness than the β-nucleated propylene polymer and/or a propylene polymer containing fillers.

Preferred propylene polymers of higher stiffness than the β-nucleated propylene polymer in the mid layer of the 3-layer pipe or in the inner layer of the 2-layer pipe are α-nucleated propylene homopolymers and/or copolymers from 90.0 to 99.9% by weight of propylene and 0.1 to 10.0% by weight of α-olefins with 2 or 4 to 18 carbon atoms.

Preferred α-nucleating agents, contained from 0.05 to 2% by weight in the propylene polymers of higher stiffness, are dibenzylidene sorbitol, derivatives of sorbitol and/or diphenylglycine; salts of $C_6$-$C_{18}$ aliphatic or $C_7$-$C_{13}$ aromatic carbonic acids, selected from sodium benzoate, tert.-butylbenzoic acid alumina salt and/or long chain $C_8$-$C_{18}$-carbonic acid salts; phosphoric acid derivatives, selected from ammonium polyphosphate, cyclic calcium phosphate compounds, sodium-2,2'-methylenebis-(4,6-di-tert.-butylphenyl)phosphate and/or bis(tert.-butyl)-phosphoric acid sodium salt; and/or talc.

Further polymers of higher stiffness may be polymers different from isotactic propylene polymers, selected from the group of tetrafluoroethylene polymers, polycarbonates, polybutyleneterephthalate, polyethyleneterephthalate, 3-methylbutene polymers, 4-methylpentene-1-polymers, syndiotactic propylene polymers, polyphenyleneoxides, propylene methylbutene copolymers, styrene acrylonitrile copolymers, polyallyltrimethylsilanes and/or hydrolysed ethylene vinylacetate copolymers.

Preferred fillers contained in the propylene polymers of the mid layer of the 3-layer pipe or in the inner layer of the 2-layer pipe are $Al_2O_3$, $Al(OH)_3$, barium sulfate, calcium carbonate, glass beads, wood flour, silica, hollow microspheres, carbon black, talcum, bentonite, mica and/or wollastonite.

A further object of the present invention is a process for producing polyolefin multilayer pipes by extrusion or injection molding processes where at least one of the layers of the multilayer pipe comprises a propylene homopolymer with melt index of 0.05 to 10 g/10 min at 230° C./2.16 kg and/or copolymers from 90.0 to 99.9% by weight of propylene and 0.1 to 10.0% by weight of α-olefins with 2 or 4 to 18 carbon atoms with melt indices of 0.05 to 15 g/10 min at 230° C./2.16 kg, wherein the propylene homopolymers and/or propylene copolymers are β-nucleated propylene polymers.

In the production of polyolefin multilayer pipes according to the invention conventional extruders are suitable. For example, the polyolefin layers may be manufactured with single screw extruders with an L/D of 20 to 40 or twin screw extruders or other types of extruders, suitable for multilayer extrusion, as described for example in U.S. Pat. No. 5,387,386 and FI 83184. Optionally, a melt pump and/or a static mixer can be used additionally between the extruder and the ring die head. Ring shaped dies with diameters ranging from approximately 20 to 2000 mm and even greater are possible. Advantageous die temperatures for discharging the melt are 180 to 240° C. After leaving the ring-shaped die, the polyolefin multilayer plastic pipes are taken off over a calibrating sleeve and cooled.

The multilayer pipe can also be manufactured in extrusion winding processes in diameters up to 3 to 4 meters or even larger.

The pipes may also be processed in corrugating devices in combination or close to the calibration step, for example for manufacturing of multilayer pipes of corrugated double/triple wall design with or without hollow sections or multilayer pipes with ribbed design.

The known methods of multilayer pipe extrusion or injection molding are described for instance, in Djordjevic, D., "Coextrusion", Rapra Review Reports, Vol. 6, No. 2, 1992, pp 51-53, or Plastic Extrusion technology, Hanser Publishers 1997, Chapter 3 (F. Hensen).

For producing the polyolefin multilayer pipes according to the invention, usual auxiliary materials e.g. 0.01 to 2.5 wt % stabilizers, 0.01 to 1 wt % processing aids, 0.1 to 1 wt % antistatic agents and 0.2 to 3 wt % pigments, in each case based on the olefin polymers used, may be used.

As stabilizers preferably mixtures of 0.01 to 0.6 wt % phenolic antioxidants, 0.01 to 0.6 wt % 3-arylbenzofuranones, 0.01 to 0.6 wt % processing stabilizers based on phosphites, 0.01 to 0.6 wt % high temperature stabilizers based on disulfides and thioethers and/or 0.01 to 0.8 wt % sterically hindered amines (HALS) are suitable.

According to a feature of the present invention the β-nucleated propylene polymers for use in at least one layer of the multilayer pipe are propylene polymers produced by melt mixing propylene homopolymers and/or propylene copolymers with 0.01 to 2.0% by weight, based on the polypropylenes used, β-nucleating agents at temperatures from 175 to 250° C.

Preferred applications of polyolefin multilayer pipes are non pressure pipe applications, preferably for outdoor use, for above as well as underground drainage and sewerage pipe systems, surface water pipes, pipes for cable protection, pipes for cold climate conditions and for indoor use, soil and waste water pipes.

The advantage of the polyolefin multilayer pipes according to the invention is the possibility to produce tailor-made polyolefin pipes, fittings, chambers and the like with a superior combination of high stiffness and good impact properties, especially at low temperatures. The layer of β-nucleated propylene polymer allows thinner pipe walls of the polyolefin multilayer pipes, utilizing larger amounts of high stiffness propylene polymers in the mid layers, and using larger amounts of recycled propylene polymers and fillers in the mid layers.

For practical testing of the impact resistance, the pipes were subjected to external blows by the staircase method according to EN 1411. In this test, a series of the polyolefin multilayer pipes were conditioned at 0° C. and subjected to a hammer with a striker type d 90 falling from different heights. As a result, $H_{50}$[=m] indicates the height, at which 50% of the pipes fail.

The energy E of the striker is calculated according to the formula $$E = m \cdot g \cdot H_{50}$$

wherein m is the mass of the striker in kg (normally between 4 and 12.5 kg) and g is the gravitational acceleration (9.81 m/s$^2$) and $H_{50}$ is the height in meter from which the striker is dropped, when 50% of the pipes fail.

The energy $E_D$ normalized for different pipe diameters can be calculated as the energy E divided by the outer diameter of the pipe (in meter).

For pipes with outer diameters of less than 0.25 m it is desirable that the impact energy $E_D$ is at least 400 Nm/m, preferably ≥600 Nm/m, more preferably ≥800 Nm/m, most preferably ≥1000 Nm/m.

For pipes with outer diameters of 0.25 m the pipe dimensions are normally relatively thinner and it is desirable that the energy E is at least 120 Nm, preferably ≥180 Nm, more preferably ≥240 Nm and most preferably ≥300 Nm.

Ring stiffness tests have been performed according to ISO 9969 at +23° C. According to the thus determined ring stiffness values the pipes may be classified in ring stiffness classes which are 2, 4, 8, 10, 16, 20 etc.

Pipes according to the invention will be classified at least as ring stiffness class 4.

It has also been found that with certain pipes according to the present, invention it is possible to avoid the stress whitening phenomenon as is normally seen for pipes from polypropylene block copolymer materials.

Stress whitening is due to cavitational effects, i.e. the volume contraction of the material during cooling is different in the amorphous rubber phase compared with the PP-homopolymer matrix. When sufficient strain or stress is applied on the material, cavities in the interface will appear which will scatter light. This will give an optical whitening effect in the material, but for this it is necessary to either elongate the material to around the yield point, or alternatively hit (impact)

the material, which for example could happen during rough installation/transport or during processing (process elongation during manufacturing of inline sockets, during manufacturing of corrugated pipes etc).

Thus, the beneficial properties of polypropylenes and beta nucleated polypropylenes, and especially the good impact properties of beta nucleated propylene homopolymer, can be utilised, without having the negative effect of stress whitening as it would be the case when using a propylene block copolymer material (alpha or beta nucleated) in order to get sufficient impact properties. Stress whitening is also reduced with beta nucleated propylene block copolymers compared with alpha nucleated propylene block copolymers, due to the difference in crystal density (alpha=0.936 and beta=0.921). With the materials according to the invention the stiffness is also high.

A further preferred embodiment of the present invention is therefore a multilayer pipe with reduced stress whitening, where at least an inner or outer layer (or both) is comprised of a β-nucleated polypropylene homopolymer and/or propylene block copolymer as it is used according to the invention. By using such beta nucleated propylene polymers there will be a reduced or no whitening effect but still good impact and stiffness as well as other properties. Still higher stiffness levels can be achieved by, for example, a mid layer, which is comprised of e.g. a-nucleated and/or filled material.

EXAMPLES

The following tests were made using injection molded test specimen prepared according to ISO 1873
Tensile modulus according to ISO 527 (cross head speed 1 mm/min) at +23° C. Charpy impact strength, notched, according to ISO 179/1eA
Impact resistance according to EN 1411 (staircase method, striker d 90, $H_{50}$-value at 0° C./4.0 kg)
Ring stiffness according to ISO 9969 at +23° C.

Example 1

1.1 Preparation of the β-Nucleated Propylene Polymer

A mixture of
90 wt % of a propylene block copolymer, obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985 and a melt index of 0.30 g/10 min at 230° C./2.16 kg,
10% by weight of a master batch comprising 99 parts by weight of a propylene block copolymer having an ethylene content of 8.3 wt %, an IRτ of the propylene homopolymer block of 0.985, and a melt index of 0.30 g/10 min at 230° C./2.16 kg, and 1 part by weight of pimelic acid calcium salt, and 0.1 wt % calcium stearate, 0.1 wt % tetrakis[methylene (3,5-di-t-butylhydroxyhydrocinnamate)]methane and 0.1 wt % tris-(2,4-di-t-butylphenyl)phosphite, based on the sum of the propylene polymers used, is melted in a twin screw extruder with a temperature profile of 100/145/185/210/220/225/225/225/220/200/185° C., homogenized, discharged and pelletized.

The resulting polypropylene polymer has a melt index of 0.32 g/10 min at 230° C./2.16 kg, a tensile modulus of 1290 MPa and a Charpy impact strength, using notched test specimens, at −20° C. of 39 kJ/m².

1.2 Manufacture of the Polyolefin 2-Layer Pipe

For manufacturing the polyolefin multilayer pipes, a conventional pipe extruder having a screw diameter of 60 mm, L/D=28, and one conventional side extruder having a screw diameter of 50 mm, all connected to a multilayer tool of conventional design, having the possibility of extruding 1-3 layers of varying thickness of the materials and composition of the layers, was used. The pipes were calibrated and cooled by means of a conventional downstream equipment.

For producing the 2-layer pipe, the 60 mm extruder (temperature profile 200/230/230/230/230/230/210/210° C.) for the inner layer was fed with a recycled mixed propylene polymer (melt index 0.5 g/10 min at 230° C./2.16 kg), and a 50 mm side extruder (temperature profile 180/200/225/225/210° C.) for the outer layer was fed with the β-nucleated propylene polymer of 1.1.

1.2.1.

The resulting 2-layer pipe, produced at a line speed of 1.1 m/min, has an outer diameter of 110 mm and an wall thickness of 5.2 mm. Thickness of the outer layer was 1.9 mm and of the inner layer 3.3 mm.

Energy $E_D$ was 0.1070 Nm/m and ring stiffness was 11.7 kN/m².

1.2.2.

A further 2 layer pipe, produced at a line speed of 1.1 m/min has an outer diameter of 110 mm and a wall thickness of 4.1 mm. Thickness of the outer layer was 1.0 mm and of the inner layer 3.1 mm.

Energy $E_D$ was ≥620 Nm/m and ring stiffness was 6 kN/m².

1.2.3

A further 2 layer pipe, produced at a line speed of 1.1 m/min has an outer diameter of 110 mm and a wall thickness of 3.5 mm. Thickness of the outer layer was 1.0 mm and of the inner layer 2.5 mm.

Energy $E_D$ was ≥470 Nm/m and ring stiffness was 4.2 kN/m².

Example 2

2.1 Preparation of the β-Nucleated Propylene Polymer

A mixture of
94 wt % of a propylene homopolymer, obtained by bulk polymerization using a Ziegler-Natta catalyst system with dicyclopentyldimethoxysilane as external donor, having an IRτ of 0.985 and a melt index of 0.2 g/10 min at 230° C./2.16 kg,
6 wt % of a master batch comprising 99.8 parts by weight of a propylene block copolymer having an ethylene content of 8.3% by weight, an IRτ of the propylene homopolymer block of 0.985, and a melt index of 0.30 g/10 min at 230° C./2.16 kg, and 0.2 parts by weight of a mixed crystal of 5,12-dihydro(2,3b)acridine-7,14-dione with quino(2,3b)acridine-6,7,13,14-(5H,12H)tetrone, and 0.05 wt % magnesium stearate, 0.1 wt % tetrakis[methylene(3,5-di-t-butyl-hydroxyhydrocinnamate)]methane and 0.1 wt % tris-(2,4-di-t-butyl-phenyl)-phosphite, based on the sum of the propylene polymers used, is melted in a twin screw extruder with a temperature profile of 100/145/190/215/225/230/230/215/205/190° C., homogenized, discharged and pelletized.

The resulting polypropylene polymer has a melt index of g/10 min at 230° C./2.16 kg, a tensile modulus of 1335 MPa and a Charpy impact strength, using notched test specimens, at −20° C. of 35 kJ/m².

2.2 Manufacture of the Polyolefin Multilayer Pipe

For producing the 3-layer pipe, the pipe extruder of 1.2 was used. The 60 mm extruder (temperature profile 200/230/230/230/230/230/210/210° C.) for the intermediate layer was fed with a blend of 70% by weight of a block propylene-ethylene copolymer (melt index 0.5 g/10 min at 230° C./2.16 kg, 4.2% by weight of ethylene) and 30% by weight of talcum, and both 50 mm side extruders (temperature profile 180/200/225/225° C.) for the inner and outer layer were fed with the (3-nucleated propylene polymer of 2.1.

The resulting 3-layer pipe, produced at a line speed of 1.0 m/min, has an outer diameter of 110 mm and an wall thickness of 3.8 mm. The thickness of the outer layer was 1.0 mm, of the intermediate layer 1.8 mm and of the inner layer 1.0 mm.

Energy $E_D$ was ≥1070 Nm/m and ring stiffness was 8.1 kN/m².

Example 3

3.1 Preparation of the β-Nucleated Propylene Polymer

A mixture of
75 wt % of a propylene block copolymer obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985, and a melt index of 0.30 g/10 min at 230° C./2.16 kg,
25 wt % of a master batch comprising 99.5 parts by weight of a propylene block copolymer having an ethylene content of 8.3 wt %, an IRτ of the propylene homopolymer block of 0.985 and a melt index of 0.30 g/10 min at 230° C./2.16 kg, and 0.5 parts by weight of hexahydrophthaloylglycine calcium salt, and 0.1 wt % calcium stearate, 0.1 wt % tetrakis[methylene(3,5-di-t-butylhydroxyhydrocinnamate)]methane and 0.1 wt % tris-(2,4-di-t-butylphenyl)phosphite, based on the sum of the propylene polymers used, is melted in twin screw extruder with a temperature profile of 100/145/185/210/220/225/225/200/185° C., homogenized, discharged and pelletized. The resulting polypropylene polymer has a melt index of 0.32 g/10 min at 230° C./2.16 kg, a tensile modulus of 1310 MPa and a Charpy impact strength, using notched test specimens, at –20° C. of 37 kJ/m².

3.2. Manufacture of the Polyolefin Multilayer Pipe

For producing the 2-layer pipe, the pipe extruder of 1.2 was used. The 60 mm extruder (temperature profile 200/230/230/230/230/210° C.) for the inner layer was fed with a random propylene-ethylene copolymer (melt index 0.25 g/10 min at 230° C./2.16 kg, 3.5% by weight of ethylene), and the 50 mm side extruder (temperature profile 180/200/225/225/210° C.) for the outer layer was fed with the β-nucleated propylene polymer of 3.1.

The resulting 2-layer pipe, produced at a line speed of 1.6 m/min, has an outer diameter of 110 mm and an wall thickness of 5.0 mm. The thickness of both layers was 2.5 mm.

Energy $E_D$ was ≥1070 Nm/m and ring stiffness was 10.1 kN/m².

Example 4

4.1 Preparation of the β-Nucleated Propylene Polymer

A mixture of
93 wt % of a propylene homopolymer, obtained by bulk polymerization using a Ziegler-Natta catalyst system with dicyclopentyldimethoxysilane as external donor, having an IRτ of 0.985 and a melt index of 0.2 g/10 min at 230° C./2.16 kg,
7 wt % of a master batch comprising 99.8 parts by weight of a propylene block copolymer having an ethylene content of 8.3% by weight, an IRτ of the propylene homopolymer block of 0.985, and a melt index of 0.30 g/10 min at 230° C./2.16 kg, and 0.2 parts by weight of a mixed crystal of 5,12-dihydro(2,3b)acridine-7,14-dione with quino(2,3b)acridine-6,7,13,14-(5H,12H)tetrone, and 0.05 wt % magnesium stearate, 0.1 wt % tetrakis[methylene(3,5-di-t-butyl-hydroxyhydrocinnamate)]methane and 0.1 wt % tris-(2,4-di-t-butyl-phenyl)-phosphite, based on the sum of the propylene polymers used, is melted in a twin screw extruder with a temperature profile of 100/145/190/215/225/230/230/215/205/190° C., homogenized, discharged and pelletized.

The resulting polypropylene polymer has a melt index of 0.22 g/10 min at 230° C./2.16 kg, a tensile modulus of 1340 MPa and a Charpy impact strength, using notched test specimens, at –20° C. of 36 kJ/m².

4.2 Manufacture of the Polyolefin Multilayer Pipe

For producing the 3-layer pipe, the pipe extruder of 1.2 was used. The 60 mm extruder (temperature profile 200/230/230/230/230/230/210/210° C.) for the intermediate layer was fed with a blend of 70% by weight of a block propylene-ethylene copolymer (melt index 0.5 g/10 min at 230° C./2.16 kg, 4.2% by weight of ethylene) and 30% by weight of talcum, and both 50 mm side extruders (temperature profile 180/200/225/225° C.) for the inner and outer layer were fed with the β-nucleated propylene polymer of 4.1.

4.2.1

The resulting 3-layer pipe, produced at a line speed of 1.0 m/min, has an outer diameter of 110 mm and a wall thickness of 5.0 mm. The thickness of the outer layer was 1.0 mm, of the intermediate layer 3.0 mm and of the inner layer 1.0 mm.

Energy $E_D$ was ≥1070 Nm/m and ring stiffness was 17.0 kN/m².

4.2.2

A further 3-layer pipe, produced at a line speed of 1.0 m/min, has an outer diameter of 110 mm and a wall thickness of 3.8 mm. Thickness of the outer layer was 0.5 mm, of the intermediate layer 2.8 mm and of the inner layer 0.5 mm.

Energy $E_D$ was ≥440 Nm/m and ring stiffness was 8.5 kN/m².

Example 5

5.1. Preparation of the β-Nucleated Propylene Polymer

A mixture of
75 wt % of a propylene block copolymer obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985, and a melt index of 0.30 g/10 min at 230° C./2.16 kg, 25 wt % of a master batch comprising 99.5 parts by weight of a propylene block copolymer having an ethylene content of 8.3 wt %, an IRτ of the propylene homopolymer block of 0.985 and a melt index of 0.30 g/10 min at 230° C./2.16 kg, and 0.5 parts by weight of hexahydrophthaloylglycine calcium salt, and 0.1 wt % calcium stearate, 0.1 wt % tetrakis [methylene(3,5-di-t-butylhydroxyhydrocinnamate)]methane and 0.1 wt % tris-(2,4-di-t-butylphenyl)phosphite, based on the sum of the propylene polymers used, is melted in twin screw extruder with a temperature profile of 100/145/185/ 210/220/225/225/200/185° C., homogenized, discharged and pelletized. The resulting polypropylene polymer has a melt index of 0.32 g/10 min at 230° C./2.16 kg, a tensile modulus of 1310 MPa and a Charpy impact strength, using notched test specimens, at −20° C. of 37 kJ/m².

5.2. Manufacture of the Polyolefin Multilayer Pipe

For producing the 2-layer pipe, the pipe extruder of 1.2 was used. The 60 mm extruder (temperature profile 200/230/230/ 230/230/210° C.) for the inner layer was fed with a mixture of 70% random propylene-ethylene copolymer (melt index 0.25 g/10 min at 230° C./2.16 kg, 3.5% by weight of ethylene), with 30% talc and the 50 mm side extruder (temperature profile 180/200/225/225/210° C.) for the outer layer was fed with the β-nucleated propylene polymer of 3.1.

The resulting 2-layer pipe, produced at a line speed of 1.6 m/min, has an outer diameter of 110 mm and an wall thickness of 4.2 mm. The thickness of both layers was 2.1 mm.

Energy $E_D$ was ≥1070 Nm/m and ring stiffness was 9.9 kN/m².

Example 6

6.1 Preparation of the β-Nucleated Propylene Polymer

A mixture of
95 wt % of a propylene homopolymer, obtained by bulk phase polymerization using a Ziegler-Natta catalyst system with dicyclopentyldimethoxysilane as external donor, having an IRτ of 0.987 and a melt index of 1.1 g/10 min at 230° C./2.16 kg,
5 wt % of a master batch comprising 97.5 parts by weight of a propylene homopolymer having an IRτ of 0.987 and a melt index of 4.2 g/10 min at 230° C./2.16 kg, and 2.5 parts by weight of N,N'-dicyclohexyl-2,6-naphthalenedicarboxamide and 0.05 wt % calcium stearate, 0.1 wt % tetrakis[methylene (3,5-di-t-butylhydroxyhydrocinnamate)]-methane and 0.1 wt % tris-(2,4-di-t-butylphenyl)-phosphite, based on the sum of the propylene polymers used, is melted in a twin screw extruder with a temperature profile of 100/145/190/215/225/ 205/190° C., homogenized, discharged and pelletized.

The resulting polypropylene polymer has a melt index of 1.2 g/10 min at 230° C./2.16 kg, a tensile modulus of 1765 MPa and a Charpy impact strength, notched, of 5.5 kJ/m² at −20° C.

6.2. Manufacture of the Polyolefin Multilayer Pipe

For producing the 3-layer pipe, the pipe extruder of 1.2 was used. The 60 mm extruder (temperature profile 200/230/230/ 230/230/230/210° C.) for the intermediate layer was fed with a blend of 70% by weight of a propylene homopolymer (melt index 0.8 g/10 min at 230° C./2.16 kg, 4.2% by weight of ethylene) and 30% by weight of talcum, and both 50 mm side extruders (temperature profile 180/200/225/225° C.) for the inner and outer layer were fed with the β-nucleated propylene polymer of 6.1.

6.2.1

The resulting 3-layer pipe, produced at a line speed of 1.0 m/min, has an outer diameter of 110 mm and a wall thickness of 5.0 mm. The thickness of the outer layer was 1.0 mm, of the intermediate layer 3.0 mm and of the inner layer 1.0 mm.

Energy $E_D$ was ≥490 Nm/m and ring stiffness was 21.5 kN/m².

6.2.2

A further 3-layer pipe, produced at a line speed of 1.0 m/min, has an outer diameter of 110 mm and a wall thickness of 4.2 mm. Thickness of the outer layer was 0.7 mm, of the intermediate layer 2.7 mm and of the inner layer 0.8 mm.

Energy $E_D$ was ≥420 Nm/m and ring stiffness was 12.2 kN/m².

What is claimed is:

1. A multilayer pipe comprised of a plurality of layers, at least one of the layers being comprised of:
   a β-nucleated propylene polymer that is:
   a propylene homopolymer having melt index of 0.05 to 10 g/10 min at 230° C. at a load of 2.16 kg that is β-nucleated,
   a propylene block copolymer of 90.0 to 99.9% by weight propylene and 0.1 to 10.0% by weight of one or more α-olefins having 2 or 4 to 18 carbon atoms and a melt index of 0.05 to 15 g/10 min at 230° C. at a load of 2.16 kg that is β-nucleated,
   or a mixture of both; wherein
   the normalized impact energy $E_D$ of the multilayer pipe is at least 600 Nm/m, and further wherein
   the β-nucleated propylene homopolymer has an IRτ≥0.98, a tensile modulus of ≥1500 MPa at +23° C. and a notched Charpy impact strength at −20° C., of ≥3 kJ/m² and the β-nucleated propylene block copolymer has an IRτ≥0.98, a tensile modulus of ≥1100 MPa at +23° C. and a notched Charpy impact strength ≥6 kJ/m² at −20° C.

2. The multilayer pipe according to claim 1, wherein the multilayer pipe is a 2-layer pipe or a 3-layer pipe, the 2-layer pipe having an outer layer comprising said β-nucleated propylene polymer and an inner layer comprising a β-nucleated propylene polymer and the 3-layer pipe having outer and inner layers each comprising said β-nucleated propylene polymer and a middle layer comprising a β-nucleated propylene polymer.

3. The multilayer pipe according to claim 1, wherein the β-nucleated propylene polymer contains 0.0001 to 2.0 wt %, based on the polypropylene, of pimelic acid calcium salt, and/or a mixed crystal of 5,12-dihydro(2,3b)acridine-7,14-dione with quino(2,3b)acridine-6,7,13,14-(5H,12H)tetrone, and/or hexahydrophthaloylglycine calcium salt, as β-nucleating agent.

4. The multilayer pipe of claim 1, wherein the β-nucleated propylene polymers are obtained by polymerization with a Ziegler-Natta catalyst system comprising titanium-containing solid components, an organoalumina, magnesium or titanium compound as cocatalyst and an external donor according to the formula

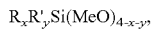

wherein R and R' are identical or different and are branched or cyclic aliphatic or aromatic hydrocarbon residues, and y and x independently from each other are 0 or 1, provided that x+y are 1 or 2.

5. Multilayer pipe according to claim 4, wherein the external donor is dicyclopentyldimethoxysilane.

6. The multilayer pipe according to claim 1, wherein the β-nucleated propylene polymer contains 0.0001 to 2.0 wt %, based on the polypropylene, of
dicarboxylic acid derivative diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, and/or
diamine derivative diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, and/or
amino acid derivative diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, and/or
quinacridone compounds, quinacridonequinone compounds, and/or dihydroquinacridone compounds, and/or
dicarboxylic acid salts of metals from group IIa of the periodic system and/or mixtures of dicarboxylic acids and metals from group IIa of the periodic system, and/or
salts combining metals from group IIa of periodic system with imido acids of the formula

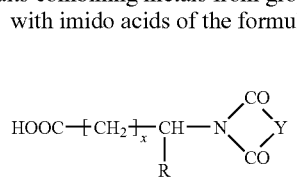

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, as β-nucleating agent.

7. The multilayer pipe according to claim 1, wherein the multilayer pipe is a 3-layer pipe having outer and inner layers each comprising said β-nucleated propylene polymer and a middle layer comprising a propylene polymer selected from a recycled propylene polymer, a propylene polymer of higher stiffness than said β-nucleated propylene polymer, or a propylene polymer containing filler.

8. The multilayer pipe according to claim 1, wherein the multilayer pipe is a 2-layer pipe having an outer layer comprising said β-nucleated propylene polymer and an inner layer comprising a propylene polymer selected from a recycled propylene polymer, a propylene polymer of higher stiffness than the β-nucleated propylene polymer, or a propylene polymer containing filler.

9. The multilayer pipe according to claim 1, wherein the multilayer pipe is a smooth pipe with or without wall hollow sections.

10. The multilayer pipe according to claim 1, wherein the multilayer pipe is a corrugated or ribbed pipe with or without wall hollow sections.

11. The multilayer pipe according to claim 1, wherein said multilayer pipe has a diameter less than 0.25 m and has an impact energy $E_D$ (normalised) of at least 400 Nm/m and a ring stiffness S determined according to ISO 9969 of ≥4 kN/m².

12. The multilayer pipe according to claim 1, wherein said multilayer pipe has a diameter ≥0.25 m and has an impact energy E of at least 120 Nm and a ring stiffness S determined according to ISO 9969 of ≥4 kN/m².

13. A multilayer pipe according to claim 12, wherein said impact energy E is at least 180 Nm.

14. The multilayer pipe according to claim 1, wherein the β-nucleated propylene polymer contains 0.0001 to 2.0 wt %, based on the polypropylene, of quinacridone compounds and/or quinacridonequinone compounds, and/or dihydroquinacridone compounds, and/or dicarboxylic acid salts of metals from group IIa of the periodic system and/or salts combining metals from group IIa of periodic system with imido acids of the formula

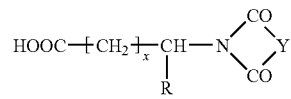

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, as β-nucleating agent.

15. The multilayer pipe according to claim 1, wherein the multilayer pipe is a 2-layer pipe or a 3-layer pipe, the 2-layer pipe having an outer layer comprising said β-nucleated propylene polymer and an inner layer comprising a recycled propylene polymer or a propylene polymer of higher stiffness than the β-nucleated propylene polymer, and the 3-layer pipe having outer and inner layers each comprising said β-nucleated propylene polymer and a middle layer comprising a recycled propylene polymer or a propylene polymer of higher stiffness than said β-nucleated propylene polymer.

16. A process for producing a multilayer pipe, comprising extruding a multilayer pipe in which at least one the layer is extruded from a melt comprising β-nucleated propylene polymer which is a β-nucleated propylene homopolymer having melt index of 0.05 to 10 g/10 min at 230° C./2.16 kg, β-nucleated propylene copolymer of 90.0 to 99.9 wt % propylene and 0.1 to 10.0 wt % α-olefins of 2 or 4 to 18 carbon atoms and having melt index of 0.1 to 15 g/10 min at 230° C./2.16 kg, or a mixture of both, the β-nucleated propylene polymer having an Irτ≥0.98, wherein the β-nucleated propylene polymer comprises the at least one layer.

17. A process for producing a multilayer pipe according to claim 16, wherein the β-nucleated propylene polymers are propylene polymers produced by melt mixing, at temperature of 175 to 250° C., propylene homopolymers and/or propylene copolymers with 0.0001 to 2.0% by weight, based on the polypropylenes, β-nucleating agents.

18. Pipe systems comprising above ground or underground and indoor or outdoor drainage and sewerage pipes, water pipes, pipes for cable protection, pipes for cold climate conditions, soil and waste water pipes, said pipe systems being comprised of the multilayer pipe according to claim 1.

19. The pipe systems according to claim 18, wherein said pipe systems are non pressure pipe systems.

20. A process for producing a multilayer pipe, comprising injection molding at least one layer of the multilayer pipe from a melt comprising β-nucleated propylene polymers which is a β-nucleated propylene homopolymer having melt index of 0.05 to 10 g/10 min at 230° C./2.16 kg, a β-nucleated propylene copolymer of 90.0 to 99.9 wt % propylene and 0.1 to 10.0 wt % α-olefins of 2 or 4 to 18 carbon atoms and having melt indexes of 0.1 to 15 g/10 min at 230° C./2.16 kg, or a mixture of both, the β-nucleated propylene polymer has an IRτ≥0.98, wherein the β-nucleated propylene polymer comprises the at least one layer.

21. The multilayer pipe according to claim 1, wherein at least one of the layers of the multilayer pipe is comprised of:
   a β-nucleated propylene polymer that is:
   a propylene homopolymer having melt index of 0.2 to 1.1 g/10 min at 230° C. at a load of 2.16 kg that is β-nucleated,
   a propylene block copolymer of 90.0 to 99.9% weight propylene and 0.1 to 10.0% by weight of one or more α-olefins having 2 or 4 to 18 carbon atoms and a melt index of 0.3 to 4.2 g/10 min at 230° C. at a load of 2.16 kg that is β-nucleated,
   or a mixture of both.

* * * * *